W. G. MYLIUS.
ELECTRICAL MEASURING INSTRUMENT.
APPLICATION FILED OCT. 8, 1918.

1,433,739.

Patented Oct. 31, 1922.
4 SHEETS—SHEET 1.

WITNESSES:

INVENTOR
Walter G. Mylius.
BY
ATTORNEY

W. G. MYLIUS.
ELECTRICAL MEASURING INSTRUMENT.
APPLICATION FILED OCT. 8, 1918.

1,433,739.

Patented Oct. 31, 1922.
4 SHEETS—SHEET 2.

WITNESSES:

INVENTOR
Walter G. Mylius.
BY
ATTORNEY

W. G. MYLIUS.
ELECTRICAL MEASURING INSTRUMENT.
APPLICATION FILED OCT. 8, 1918.

1,433,739.

Patented Oct. 31, 1922.
4 SHEETS—SHEET 3.

WITNESSES:
J. P. Wurmb.
J. H. Procter

INVENTOR
Walter G. Mylius.
BY
Wesley G. Barr
ATTORNEY

W. G. MYLIUS.
ELECTRICAL MEASURING INSTRUMENT.
APPLICATION FILED OCT. 8, 1918.
1,433,739.
Patented Oct. 31, 1922.
4 SHEETS—SHEET 4.
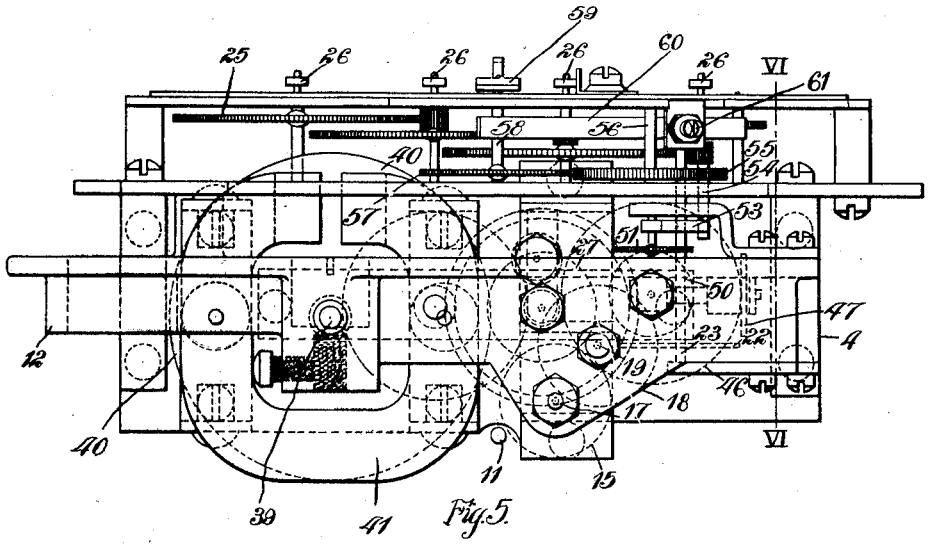
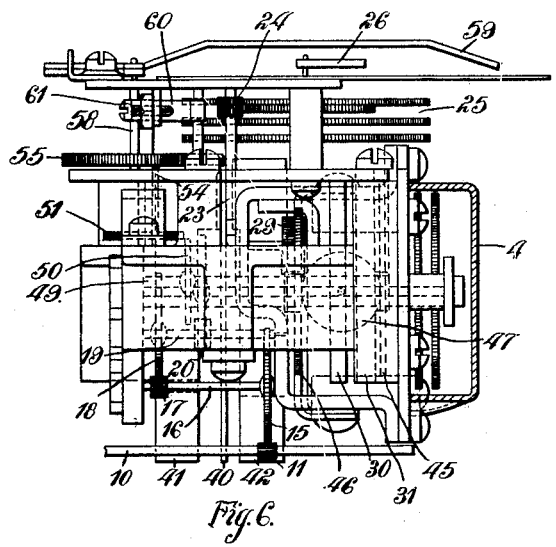
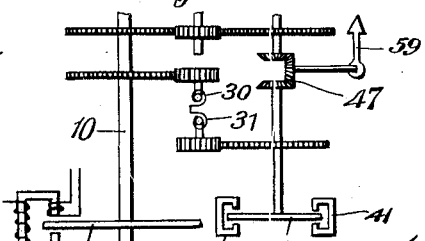
WITNESSES:
INVENTOR
Walter G. Mylius
BY
ATTORNEY

Patented Oct. 31, 1922.

1,433,739

UNITED STATES PATENT OFFICE.

WALTER G. MYLIUS, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed October 8, 1918. Serial No. 257,326.

*To all whom it may concern:*

Be it known that I, WALTER G. MYLIUS, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments, and particularly to maximum-demand meters.

One object of my invention is to provide a unitary attachment that may be conveniently substituted for the integrating mechanism of a watthour meter of the ordinary type to constitute a maximum-demand meter.

Another object of my invention is to provide an attachment, of the above-indicated character, that shall have means for actuating a pointer in accordance with the maximum value of the average load being measured.

A further object of my invention is to provide a device of the above-indicated character that shall be simple and inexpensive to construct, easily applied to the meter, and effective in its operation.

In practicing my invention, I provide an attachment for a watthour meter comprising a pointer and a spring, one end of which is actuated by the movable member of the meter and the other end of which is so connected to a damping disk that the ends of the spring assume different relative positions for each value of load. A planetary gear system is operatively connected to the ends of the spring and the planet wheel of the system is connected, through a dog or other loose driving connection, to the pointer. Thus, the pointer is actuated in accordance with the differential movements of the ends of the spring and indicates the maximum value of the average load, or, in other words, a value that may be regarded as the demand equivalent to the power traversing the meter.

Figure 1:
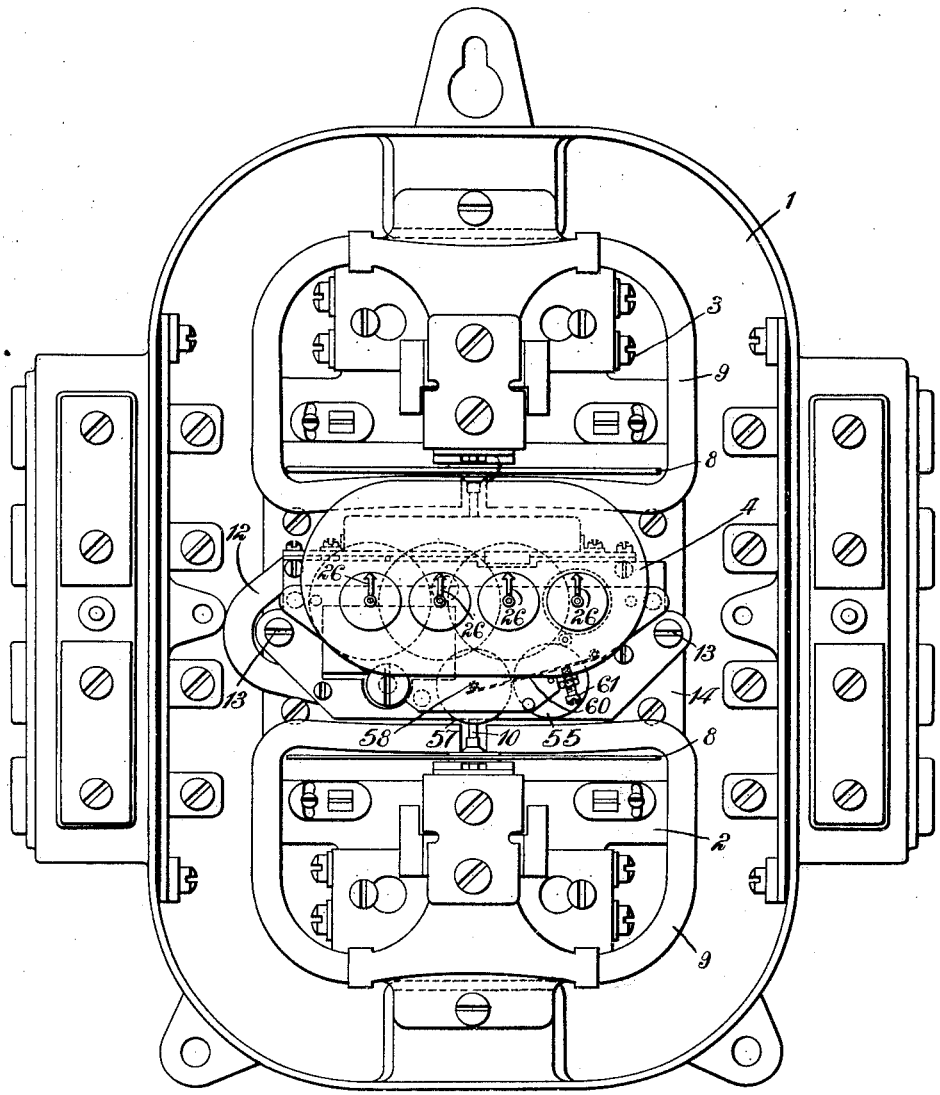
Figure 2:
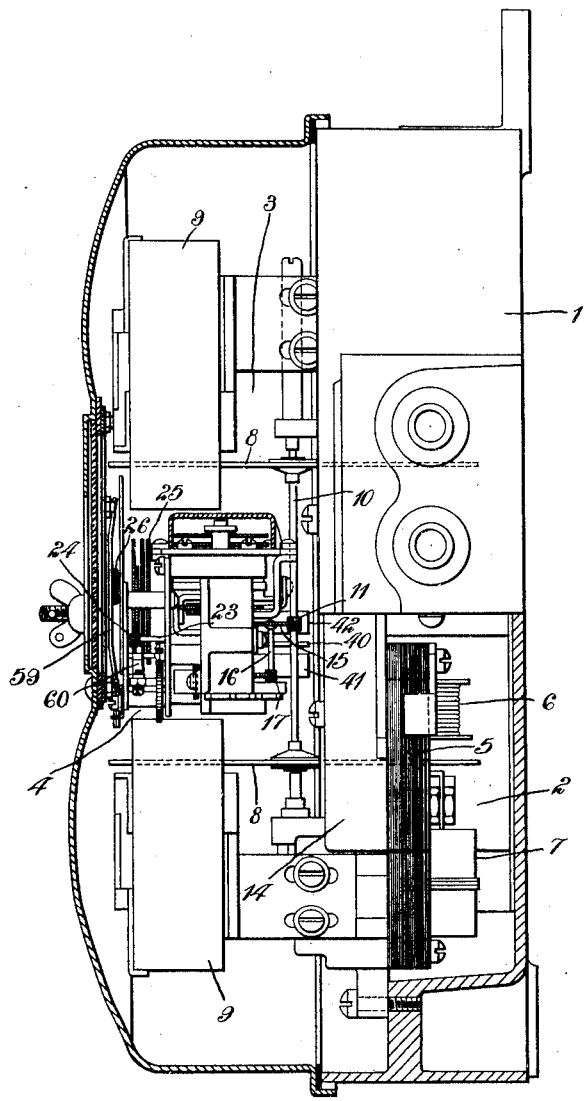
Figure 3:
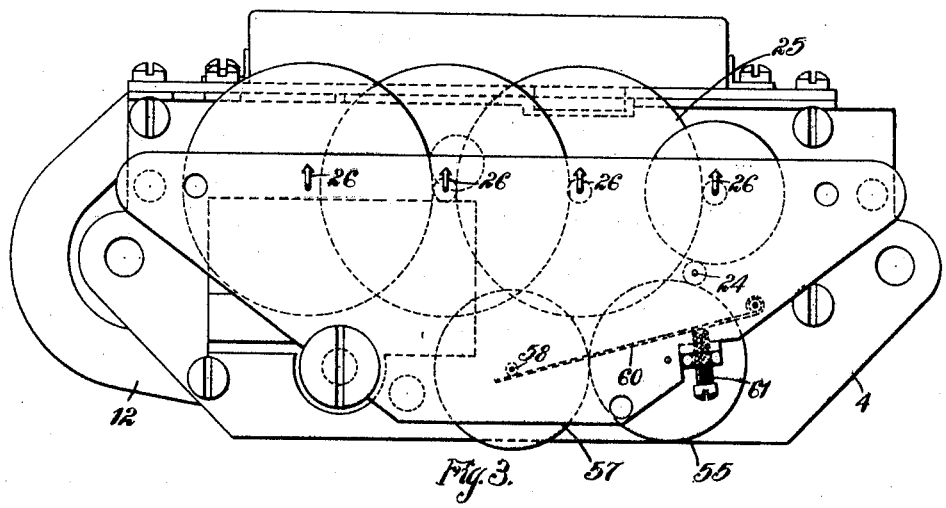
Figure 4:
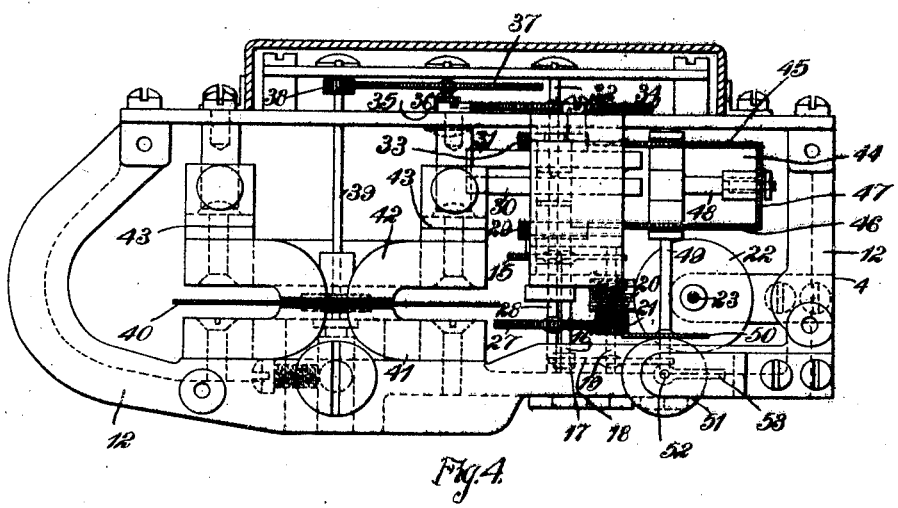

Figure 1 of the accompanying drawings is a front elevational view of a polyphase-watthour meter embodying my invention; Fig. 2 is a side view, partially in section and partially in elevation, of the meter shown in Fig. 1; Fig. 3 is a front elevational view of the maximum-demand attachment shown in Figs. 1 and 2; Fig. 4 is a front view of the attachment shown in Fig. 3, with parts broken away; Fig. 5 is a bottom plan view of the attachment shown in Figs. 3 and 4; Fig. 6 is a view taken along the line VI—VI of Fig. 5; and Fig. 7 is a diagrammatic view of a meter embodying my invention.

The polyphase watthour meter embodying my invention comprises, in general, a casing 1 in which are disposed two meter elements 2 and 3 and a maximum-demand attachment 4.

The meter elements 2 and 3 are mounted on a supporting member 14 and severally comprise a stationary magnetizable core member 5 having current and potential windings 6 and 7 thereon, a disk armature 8 and damping magnets 9. The armatures 8 of the meter elements 2 and 3 are mounted on a single shaft 10 that is provided with a pinion 11 for actuating the maximum-demand attachment 4.

The maximum-demand attachment 4 is removable and comprises a framework 12 that is adapted to be secured, by screws 13, to the supporting member 14 of the watthour meter. The attachment 4 is adapted to be substituted in place of the ordinary integrating device of a polyphase meter to thus constitute a maximum-demand meter without changing the structure of the meter itself.

The pinion 11 on the shaft 10 actuates the device 4 through a gear wheel 15 that is mounted on a shaft 16 upon which is also mounted a pinion 17. The pinion 17 engages a gear wheel 18 that is mounted on a shaft 19 upon which is also mounted a worm-screw 20 and a pinion 21. The worm screw 20 is adapted to engage a worm wheel 22 that is mounted on a shaft 23 upon which is also mounted a pinion 24 that engages a train of gear wheels 25 which constitutes an integrating mechanism for actuating pointers 26.

The pinion 21 engages a gear wheel 27 that is mounted on a shaft 28 upon which is also mounted a pinion 29, and to which the inner end of a spring 30 is connected. The outer end of the spring 30 is connected to the outer end of a similar spring 31, the inner end of which is mounted on a shaft 32. The shaft 32 is disposed in direct alinement with the shaft 28 and has a pinion 33 and a gear wheel 34 mounted thereon. The gear wheel 34 engages a pinion 35 that is mounted on a shaft 36 upon which is also mounted a gear wheel 37. The gear wheel 37 engages a pinion 38 that is mounted on a shaft 39 upon which is also mounted a disk armature 40 that is disposed between the poles of two permanent magnets 41 and 42 which are adapted to retard the movement of the same. Bimetallic members 43 are provided for adjusting the air gap between the magnets 41 and 42 in accordance with changes in temperature to thereby compensate for any error incident to the change in resistance in the armature 40 by reason of temperature changes.

A planetary gear device or system 44 comprises a gear wheel 45 that engages the pinion 33, a gear wheel 46 that engages the pinion 29 and a planet wheel 47 that is mounted on an arm 48 on the shaft 49, upon which is also mounted a crown wheel 50. The crown wheel 50 engages a second crown wheel 51 that is mounted on a shaft 52 at right angles to the shaft 49 and upon which is mounted a dog 53. The dog 53 is adapted to engage a pin 54 that is secured to one side of a gear wheel 55 which is mounted on a shaft 56, as clearly shown in Fig. 5 of the drawings. The gear wheel 55 engages a gear wheel 57 that is mounted on a shaft 58 upon which is also mounted a maximum-demand pointer 59. A spring 60 presses against the shaft 58 and is provided with an adjusting screw 61 for so frictionally holding the pointer 59 in its maximum position that it indicates, at all times, the maximum excursions of the dog 53.

When the armatures 8 of the units 2 and 3 of the watthour meter are actuated by reason of the operation of the meter, the integrating device 25, and, consequently, the integrating pointers 26, are actuated through the gear wheel 15, the pinion 17, the gear wheel 18, the worm screw 20, the worm wheel 22 and the pinion 24, to thus cause the pointers 26 to indicate the integrated energy, substantially as is customary in watthour meters of the usual character.

When the shaft 28, that is actuated in accordance with the speed of the armatures 8, is turned, the spring 30 is wound from one end and, since the springs 30 and 31 are connected together at their outer ends, the spring 31 is unwound from its outer end. Since the inner end of the spring 31 is connected, through the gear wheels 34, 35, 37 and 38, to the damping disk 40, the springs 30 and 31 will not be freely actuated. That is, they may be assumed to be a single spring, one end of which is being wound by the watthour meter, and the other end of which prevents the winding in accordance with the speed of the winding. In other words, the ends of the springs will assume different relative positions with respect to each other for each speed of the armatures 8 and, since the differential movement of the ends of the springs is a measure of the average value of energy being measured, the planetary gear system 44 is provided for determining the differential actions of the inner ends of the springs. Since the gear wheel 46 turns in one direction and the gear wheel 45 turns in the same direction, but lags behind the wheel 46, the planet wheel 47 and, consequently, the shaft 49, will be actuated in accordance with the differential action of the ends of the springs, and the dog 53 will engage the pin 54 to actuate the pointer 59 in accordance therewith. Since the pointer 59 is not permanently connected to the shaft 49 but is connected thereto through the dog 53 and the pin 54, it will be understood that the pointer 59 is merely a maximum-indicating pointer, and that it indicates only the maximum indication of the average energy being measured or, in other words, the demand equivalent of the power traversing the meter.

My invention is not limited to the specific construction illustrated, as it may be variously modified without departing from the spirit and scope of the invention, as set forth in the appended claims.

I claim as my invention:

1. The combination with a watthour meter, of a unitary attachment therefor comprising a pointer, a planetary gear system, the planet wheel of which is operatively connected to the pointer, a retarding device, a spring connected to the retarding device and adapted to be connected to the movable member of the meter, and means for connecting the other members of the planetary gear system to the retarding device and the movable member of the meter.

2. The combination with a watthour meter, of a unitary attachment therefor comprising a damping disk, a spring disposed between the damping disk and the movable member of the meter, a pointer and means for actuating the pointer in accordance with the differential movement of the two ends of the spring.

3. The combination with a watthour meter, of an attachment therefor comprising a pointer, a damping disk, resilient means connected between the movable member of the meter and the damping disk, and means for actuating the pointer in accordance with the maximum differential movement of the movable member of the meter and the damping disk.

4. The combination with a watthour meter, of an attachment therefor comprising a pointer, a damping disk, resilient means connected between the movable member of the meter and the damping disk, and a planetary gear system for actuating the pointer in accordance with the maximum differential movement of the movable member of the meter and the damping disk.

5. The combination with a watthour meter, of a pointer, a disk armature, magnets for retarding the disk armature, a spring connected between the movable member of the meter and the disk armature for actuating the same, a planetary member actuated in accordance with the differential movement of the ends of the spring, and means for operatively connecting the planetary member to the pointer.

6. The combination with a watthour meter, of a spring connected at one end to the movable member of the meter, means connected to the other end of the spring for causing a delayed movement between the ends of the spring, a differential-gear system connected to the ends of the spring, and a pointer actuated by the differential-gear system.

7. The combination with a watthour meter, of a maximum-demand attachment therefor comprising a spring one end of which is adapted to be actuated by the meter, means connected to the spring for controlling the movement of the other end thereof, and a pointer actuated in accordance with the differential movement of the ends of the spring.

In testimony whereof, I have hereunto subscribed my name this 21st day of Sept. 1918.

WALTER G. MYLIUS.